(12) United States Patent
Mansell et al.

(10) Patent No.: US 7,159,181 B2
(45) Date of Patent: Jan. 2, 2007

(54) CONTROL SYSTEM WITH CUSTOMIZABLE MENU STRUCTURE FOR PERSONAL MOBILITY VEHICLE

(75) Inventors: Wayne T. Mansell, Stourbridge (GB); Mark E. Greig, Longmont, CO (US); Peter J. Tasker, Bridgworth (GB)

(73) Assignee: Sunrise Medical HHG Inc., Longmont, CO (US)

( * ) Notice: Subject to any disclaimer, the term of this patent is extended or adjusted under 35 U.S.C. 154(b) by 384 days.

(21) Appl. No.: 10/676,522

(22) Filed: Oct. 1, 2003

(65) Prior Publication Data

US 2005/0076308 A1    Apr. 7, 2005

(51) Int. Cl.
*G06F 3/00*   (2006.01)
*G06F 3/14*   (2006.01)

(52) U.S. Cl. .................. 715/744; 715/747; 715/810; 715/841; 715/865; 701/1; 280/250.1

(58) Field of Classification Search ............... 715/700, 715/744–747, 762–765, 811, 835, 846, 847, 715/865, 961, 965, 970, 769, 810; 345/905; 701/1, 22, 36; 180/409, 907; 280/29, 250.1
See application file for complete search history.

(56) References Cited

U.S. PATENT DOCUMENTS

| | | | | |
|---|---|---|---|---|
| 5,033,000 | A * | 7/1991 | Littlejohn et al. | 701/36 |
| 5,345,226 | A * | 9/1994 | Rice et al. | 340/825.19 |
| 5,420,975 | A * | 5/1995 | Blades et al. | 715/811 |
| 5,732,368 | A * | 3/1998 | Knoll et al. | 701/1 |
| 5,821,935 | A | 10/1998 | Hartman et al. | |
| 6,201,540 | B1 | 3/2001 | Gallup et al. | |
| 6,246,410 | B1 * | 6/2001 | Bergeron et al. | 715/854 |
| 6,266,060 | B1 * | 7/2001 | Roth | 715/853 |
| 6,275,231 | B1 | 8/2001 | Obradovich | |
| 6,459,962 | B1 * | 10/2002 | Ulrich et al. | 701/1 |
| 6,526,335 | B1 * | 2/2003 | Treyz et al. | 701/1 |
| 6,686,938 | B1 * | 2/2004 | Jobs et al. | 715/835 |
| 6,819,981 | B1 * | 11/2004 | Wakefield et al. | 701/1 |
| 6,871,122 | B1 * | 3/2005 | Wakefield, II | 701/1 |
| 6,998,976 | B1 | 2/2006 | Kawai et al. | |
| 2001/0026291 | A1 * | 10/2001 | Uchida | |
| 2002/0085043 | A1 * | 7/2002 | Ribak | |
| 2002/0111715 | A1 * | 8/2002 | Richard | |
| 2002/0198635 | A1 * | 12/2002 | Obradovich et al. | 701/1 |
| 2003/0040850 | A1 * | 2/2003 | Najmi et al. | |
| 2004/2246804 | * | 3/2004 | Chang | |
| 2004/0214597 | A1 | 10/2004 | Suryanarayana et al. | |
| 2005/0107925 | A1 * | 5/2005 | Enigk et al. | 701/1 |
| 2005/0203684 | A1 * | 9/2005 | Borgesson | |
| 2005/0222726 | A1 | 10/2005 | Furui et al. | |
| 2005/0231520 | A1 * | 10/2005 | Forest | 345/581 |
| 2006/0095177 | A1 | 5/2006 | Donk et al. | |

OTHER PUBLICATIONS

Sunrise Medical, Qickie SmartSeat, sunrisemedical.com, Dec. 2003, webpage.
Sunrise Medical, Qickie SmartSeat Manual, Dec. 2003, p. 1-23.

* cited by examiner

*Primary Examiner*—Lucila X. Bautista
(74) *Attorney, Agent, or Firm*—MacMillan, Sobanski & Todd, LLC (57) ABSTRACT

A wheelchair assembly comprises a wheelchair. A plurality of modules is provided on the wheelchair. An input device is provided on the wheelchair. A controller includes a display having a displayed menu. The controller is responsive to the input device for selectively changing the displayed menu and for selectively causing the controller to operate the plurality of modules.

18 Claims, 8 Drawing Sheets

CONTROL SYSTEM WITH CUSTOMIZABLE MENU STRUCTURE FOR PERSONAL MOBILITY VEHICLE

BACKGROUND OF INVENTION

This invention relates in general to motor vehicles and, more particularly, to control systems for motorized vehicles.

Electronic control systems for personal mobility vehicles, such as power wheelchairs, scooters, and the like, are well known. Such systems control the motion and behavior of the vehicle in response to command signals from a user (e.g., a wheelchair occupant or attendant). Generally, such systems control the function of drive wheels, which support the vehicle for movement on a supporting surface. In addition, various other functions are controlled by the control system, including the vehicle seat and light functions and accessory functions. These functions may also be controlled in response to command signals from the user.

Conventional electronic control systems require users to execute a very large number of sequential input commands by navigating through a menu structure. Many wheelchair occupants are not able execute complicated sequential input commands. Ease of use of the electronic control system, especially reducing the number of menu navigation command sequences required for activities of daily living, is a major issue in designing and applying an electronic control system to a wheelchair. Currently available electronic control systems generally do not facilitate ease of use because menu navigation is only possible by moving through a fixed menu structure.

What is needed is a control system that overcomes the foregoing deficiencies.

SUMMARY OF INVENTION

The present invention is directed toward a control system that has the ability to order its menu structure to group commonly used areas of the structure together, thus avoiding the need to frequently navigate through seldom-used portions of a standard menu structure.

The invention is also directed toward a display for an electronic control system for a personal mobility vehicle, wherein the display has a customized menu structure having one or more menu selection items that are unique to a particular user of the vehicle.

The invention is further directed toward a method for customizing a menu structure of an electronic control system for a personal mobility vehicle, wherein the menu structure is customized for a particular occupant of the vehicle, wherein the occupant has one or more vehicle operation preferences. The method comprises the step of providing a personal mobility vehicle having a display for displaying a menu structure and a controller for controlling the operation of the vehicle according to menu selection items selected by an input device. A menu structure is created, wherein the menu structure includes one or more menu selection items associated with the one or more operation preferences of the occupant.

The invention is also directed toward a method for customizing a control system menu structure for a personal mobility vehicle. The method comprises the steps of providing a menu selection item that is customized for the wheelchair user, assigning an action message to the menu selection item, and directing the action message to a target.

The invention is also directed toward a programmable menu structure for a personal mobility vehicle, wherein the menu has a structure with an ability to be rearranged according to preferences of a user.

The invention is also directed toward a display for an electronic control system for a personal mobility vehicle, wherein the display has one or more menu selection items that are labeled with customizable text, icons, or a combination thereof.

The invention is further directed toward a menu for a personal mobility vehicle control system, wherein the menu comprises menu items having functions programmably assigned to the menu items.

Various objects and advantages of this invention will become apparent to those skilled in the art from the following detailed description of the preferred embodiment, when read in light of the accompanying drawings.

DETAILED DESCRIPTION

Figure 1:
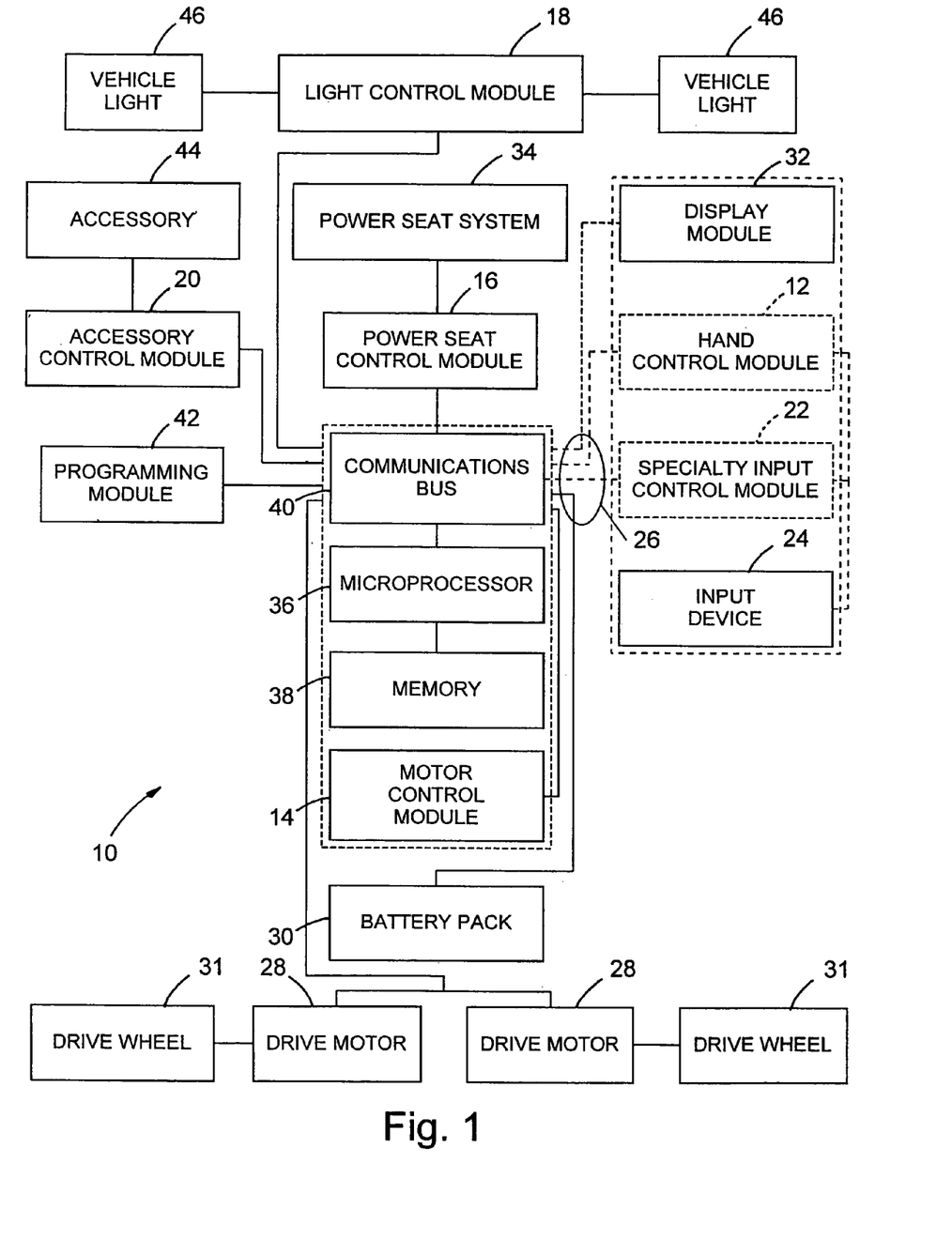
FIG. 1 is a diagrammatic representation of an electronic control system in accordance with a preferred embodiment of the invention.

Referring now to the drawings, there is illustrated in FIG. 1 a diagrammatic representation of an electronic control system 10 for a personal mobility vehicle, such as power wheelchairs, scooters, and the like. The control system 10 includes various modules, such as hand control modules 12, motor control modules 14, power seat control modules 16, light control modules 18, environmental control modules 20, specialty input control modules 22, and specialty input devices 24, such as pneumatic input devices and groupings of switches designed for access by users with limited body control. The modules are connected together by electrical cables 26 that carry command signals from module to module within the control system 10 and/or carry electronic power to the various parts of the electrical system of the vehicle.

The control system 10 is adapted to be custom-configured by a healthcare professional for a specific user to match the user's physical and cognitive skills, and may not contain all the aforementioned modules, but only those modules needed by that specific user. For example, if the intended user is a spinal chord injury paraplegic with normal arm and hand function and normal cognitive skills, the control system 10 might include only a hand control module 12, which may include a joystick and various switches, and a motor control module 14 to accept input signals from the hand control module 12, accept power from a battery pack 30, and output power to drive motors 28. These two modules 12, 14 may be connected by electrical cables 26 that carry command signals from the hand control module 12 to the motor control module 14 and carry electronic power to the various parts of the electrical system of the vehicle. The hand control module 12 could be physically positioned on the vehicle armrest, near the user's hand, and the motor control module 14 could be positioned underneath the seat (not shown) near the battery pack 30 and the motors 28 that drive the wheels 31.

As another example, a less physically capable user, such as a high level quadriplegic spinal chord injury user with no arm and hand function and only limited ability to move the head, but with normal cognitive skills and ability to suck and blow lightly into a plastic tube, might have a specialty input control module 24, a display module 32, a motor control module 14, and a power seat control module 16. The specialty input control module 24 may include a variety of input ports to accept signals from switches, proportional devices, and/or pneumatic input devices (none of which are shown). A pneumatic input device converts sequences of slight changes in air pressure (commonly called "sips" or "puffs") created by the user on a plastic tube (not shown) into commands to control the vehicle and/or movement of the power seat system 34. The power-seat control module 16 is used to control the position of the user's seat system 34, for example, by changing the seat height, the angle of the backrest, the seat tilt angle, and the position of the legrests (none of which are shown). The display module 32 gives the user visual feedback regarding the state of the control system 10, the state of charge of the battery pack 30, the position of the power seat system 34, and/or other information of interest to the user.

The electronic control system 10 may include a programmable digital microprocessor 36 and a memory 38 with imbedded software to programmably control the operation of the vehicle. Various modules of the system 10 may communicate with each other over a digital communications bus 40. The system communications bus 40 may also provide power to the various modules.

When the vehicle is initially set up for a given user, a programming module 42 may be connected to the system 10 to allow a technician to configure the software appropriately for that user, or to monitor the system 10 in use. Programming may include telling the system 10 what modules are connected (unless the system 10 is able to automatically detect the modules) and setting various parameters, such as the maximum speed or acceleration rate that would be appropriate for the specific user.

The various modules used to structure the control system 10 for the specific user may include input devices, input modules, visual feedback or display modules, motor control modules, power seat control modules, light control modules, environmental control modules, and programming modules.

Input devices may be in the form of switched inputs or analog inputs. Input devices are normally connected to input modules, which translate the signals from the input device to the control system 10 digital communications bus 40. Switched inputs are on/off switches physically arranged in design to allow access by a disabled person with limited body function. Arrangements of one or more switches can be used to control movements of the vehicle and accessory functions, and can be placed on trays, on headrests, or other places (none of which are shown) reachable by disabled people. Switch closures by the user are interpreted into control commands by the system 10 based on the programming of the software and the operation of the input module. For example, a switch closure may start the vehicle moving forward at a preprogrammed speed, a second closure of another switch may then stop the vehicle movement. Analog inputs are proportional devices that are specially designed to allow access by disabled people. A commonly used example of an analog input device is a joystick (not shown). When the user pushes on the joystick in a certain direction, the vehicle will move in that direction and the more the joystick is displaced, the faster the vehicle will move. Another example of an analog device is a proportional device, such as a head switch (not shown), which controls the speed of the vehicle based on the degree to which the switch is depressed by the user's head. A single module, such as a hand control module 12, can contain both analog devices, such as a joystick and switched inputs, within the same module 12.

Input modules, such as the hand control module 12, may be used to accept signals from input devices, such as the input device 24, and send corresponding commands to the system communications bus 40. Some input modules, have built-in input devices, notably hand control modules 12 that have built in joysticks and switches (not shown). Some input devices also have built-in text and/or iconic displays (e.g., liquid crystal displays, commonly called LCD's) for visual feedback to the user, or LED's or similar lights for visual feedback.

Visual feedback or display modules 32 may provide visual feedback to the user about the control system 10. Display modules 32 may be stand-alone modules that generally have text or iconic displays (e.g., LCD's). This text or iconic display may, for example, show the user what input device is active and which control mode the control system 10 is in, or may allow the user to see what parameters are currently governing the control system 10, or may display the battery state-of-charge information.

Motor control modules 14 may be provided for controlling the drive wheels 31 through the drive motors 28 and may act as the hub of the system 10 as a whole and may be housed in a separate enclosure with input and output connectors. Electronic cables 26 may be provided for connecting the motor control module 14 to the battery pack 30, the drive motors 28, the digital communications bus 40, and possibly other devices in the system 10, such as, speed encoders (not shown) on the motors 28. The motor control module 14 may interpret system commands from input devices into output commands to the drive motors 28, power seat control module 16, light control modules 18, environmental control modules 20, and other parts of the system 10.

Power seat control modules 16 may be used to control the position of the power seat system 34 on the vehicle, if present, so that the position of the vehicle occupant may be adjusted. Power seat systems 34 may use electric actuators to control the seat tilt, the backrest recline, the seat height, and the legrest angles, if the vehicle is equipped with these capabilities. The power seat control module 16 translates the user input signals into commands to the power seat system 34.

Light control modules 18 control lights 46 (i.e., headlights, turn indicators, and hazard lights) on the vehicle, if such lights are present. Input signals from the user are translated into light control commands by the light control module 18.

Environmental control modules 20 may be used to allow the user to control devices or accessories 44 external to the vehicle, for example, computers or room lights, via the input device of the control system 10. The environmental control module 20 translates user inputs to control commands to operate the external device.

The programming module 42 may be provided to custom-configure the control software for a specific vehicle user to match the user's individual needs and capabilities. Many control system parameters may be set using the programming module 42, such as the maximum speed and acceleration rate.

Figure 2:
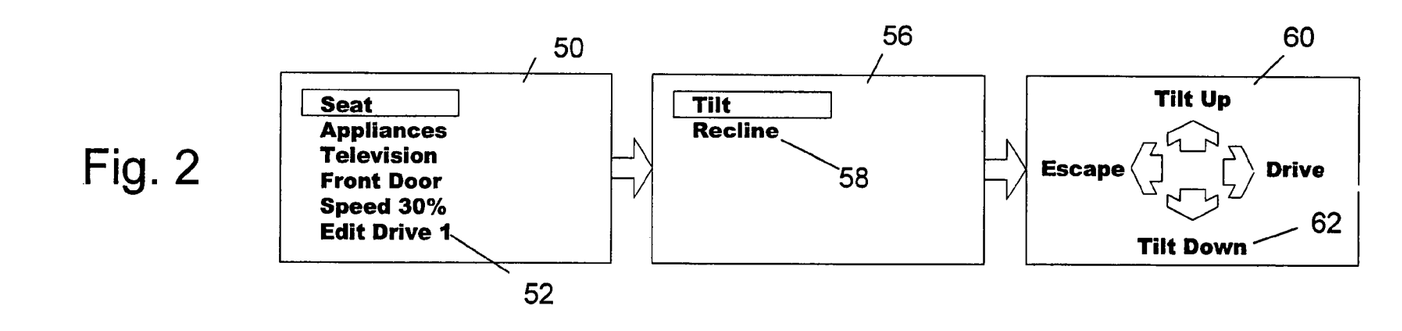
FIGS. 2–6 are diagrammatic representations of a customizable electronic control system menu structures and sample functions which may be associated with various menu selection items.

The electronic control system 10 also has a customizable menu structure, as illustrated, for example, in FIG. 2, which can be viewed on the display module 32 and navigated through via a hand control module 12, which may include a joystick and various switches, or a special input control device 24, such as a proportional device and various switches. The customizable menu structure has an ability to be rearranged according to preferences of the user. For example, the customizable menu structure is customizable so that commonly used portions of a standard (i.e., a non-customized or default factory installed) menu structure can be grouped together, avoiding the need to frequently navigate through seldom-used portions of the standard menu structure. In other words, the customizable menu structure has one or more menu selection items that are unique to a particular user.

In a preferred embodiment of the invention, the menu structure includes a main user menu, generally indicated at 50. The menu structure includes various menu selection items 52 that, for example, may be most often accessed by a particular user. The menu selection items 52 shown facilitate the operation of the power seat system 34 and various accessories and controls, and operating parameters (i.e., speed) of the vehicle. Navigation through the menu 50 may be achieved though any suitable input, such as a hand control module 12 or a specialty input control module 24. For example, a menu selection item 52, such as "Seat", can be chosen by scrolling up and down the items 52, for example, by moving a joystick, or other input device, (not shown) forward and back until the desired menu selection item is reached and then selected by moving the joystick to the right. This opens a sub-menu, as shown at 56 in FIG. 2, which contains more menu selection items 58, such as "Tilt" or "Recline". Choosing and selecting one of these menu selection items 58 opens an action menu, as indicated at 60, which contains menu selection items 62 that are associated with seat functions, such as "Tilt Up" or "Tilt Down". By moving a joystick, or other input device, (not shown) to the left, the user can return to the main menu.

Function of other menu selection items 52 in the main menu 50 are depicted, for example, in FIGS. 3–7. Selecting the menu selection item labeled "Appliance" in FIG. 3 will open an action menu. Selecting one of the menu selection items (i.e., action selection items) in the action menu will send a pulse to an assigned channel and pin (not shown) of the environmental control module 20. The pin could be connected to an infrared device for controlling an appliance (e.g., a television, a DVD, VCR, or a stereo). In this case, the user does not need to associate the channel and pin of the environmental control module 20 with the appliance. Logical menu labels are presented to assist the user in understanding the appliance associated with the menu selection items. In other words, the menu labels have content that is associated with a particular action to be performed by selecting the menu selection item. The customized menu labels are easily identified according to preferences of the user. For example, selecting the menu selection item labeled "Television" in FIG. 4 will open an action menu having action selection items for controlling the operation (e.g., the volume and the channel selection) of an appliance, such as a television (not shown). This menu carries indicia indicating that the user can escape to the next higher level (e.g., the main menu) in the menu structure by pressing the mode switch (not shown) on a hand control module 12. Selecting the menu selection item labeled "Front Door" in FIG. 5 will toggle an output of the electronic control module 20 connected to a front door opener (not shown). This controls the operation (e.g., opening and closing) of the front door (not shown). Selecting the menu selection item "Speed 30%" in FIG. 6 sets the speed parameter of the vehicle.

As is clearly illustrated, the selection of a menu selection item 52 may open a sub-menu, as is the case with the selection of the "Seat", "Appliance", or "Television" menu selection items, or may perform a function without opening a sub-menu, as is the case with the "Front Door" and "Speed 30%" menu selection items. It should be fully appreciated by one of ordinary skill in the art of the invention that the menu selection items shown may be unique to a particular user and that the menu may instead be customized to contain other menu selections items different from those shown but unique to another user.

It should be understood that the choosing and selection of menu selections items described above is only one manner in which menu selection items can be chosen and selected and that menu selection items may be chosen and selected in any other suitable manner.

The menu structure may be customized in any suitable manner. For example, menu selection items may be entered into a main menu structure, as shown in function step 64 in FIG. 7. Menu structure items may be entered into a main menu structure in any suitable manner, such as by selecting menu selection items from a list of items or by manually typing menu selection items, for example, into a field through the use of a keypad. The latter permits menu selection items to be custom labeled. A custom label may be one that the user can easily identify. Once the items are entered, the menu structure may be saved, as shown in function step 66. After menu selection items are entered and saved into the main menu, those items can be assigned a function, as shown in function step 68. This may be done in any suitable manner. For example, functions may be selected from a list or by manually typing functions into a field. Functions may include, for example, opening a sub-menu structure or action menu structure, or assigning a parameter value to some operation of the vehicle. Once functions are assigned to menu selection items, the functions may be saved, as shown in function step 70.

The foregoing functional steps 64–70 can be performed in any suitable manner. For example, the steps may be performed using a menu editor or designer, which may include any suitable program or software application, which may be removably linked to the vehicle, such as via an external device. For example, the application may be stored in a programming module, such as the programming module 42 described above. The programming module 42 may be in the form of a handheld pendant or a personal computer, which may be connected to the control system 10 via a connector.

Figure 8:
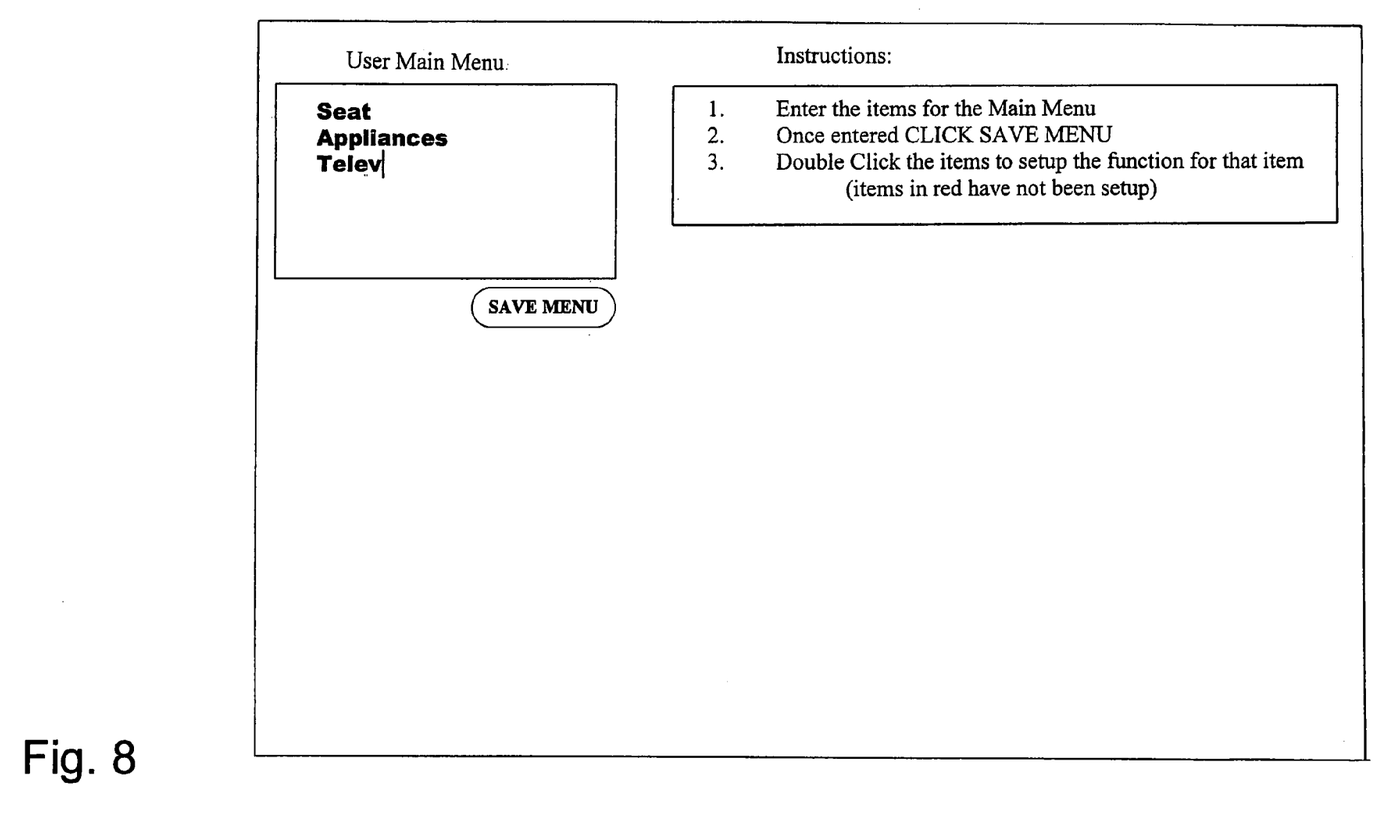
FIG. 8 is a diagrammatic representation of a menu editor window in which a main menu structure may be set up.

The application may be in the form of a user-friendly windows application. An example of an application window for setting up a main menu structure is shown in FIG. 8. The window contains step-by-step instructions for creating the main menu and assigning functions to the menu selection items. Menu selection items may be entered manually into fields or selected from a list. This can be done with a keypad or a mouse, such as by typing menu selection items into a field, clicking on items in a list, or dragging and dropping from a list into a field. The user may prompted to identify the menu selection items by text, icon, or a combination of both text and icon. Once menu selection items are entered, the items may be saved into the main menu simply by selecting a "Save Menu" button. Functions may be assigned to menu selection items, for example, by double clicking the items to which a function is to be assigned. Although not shown, functions may be selected from a list. Such functions may include, for example, opening a sub-menu structure or action menu structure, or assigning a parameter value to some operation of the vehicle. Once functions are assigned to the menu selection items, the functions may be saved simply by clicking a button in the window. Items that have not been assigned a function can be emphasized, pronounced, or highlighted in some manner, such as by allowing those items to appear in red font so that those items can be easily identified.

Figure 9:
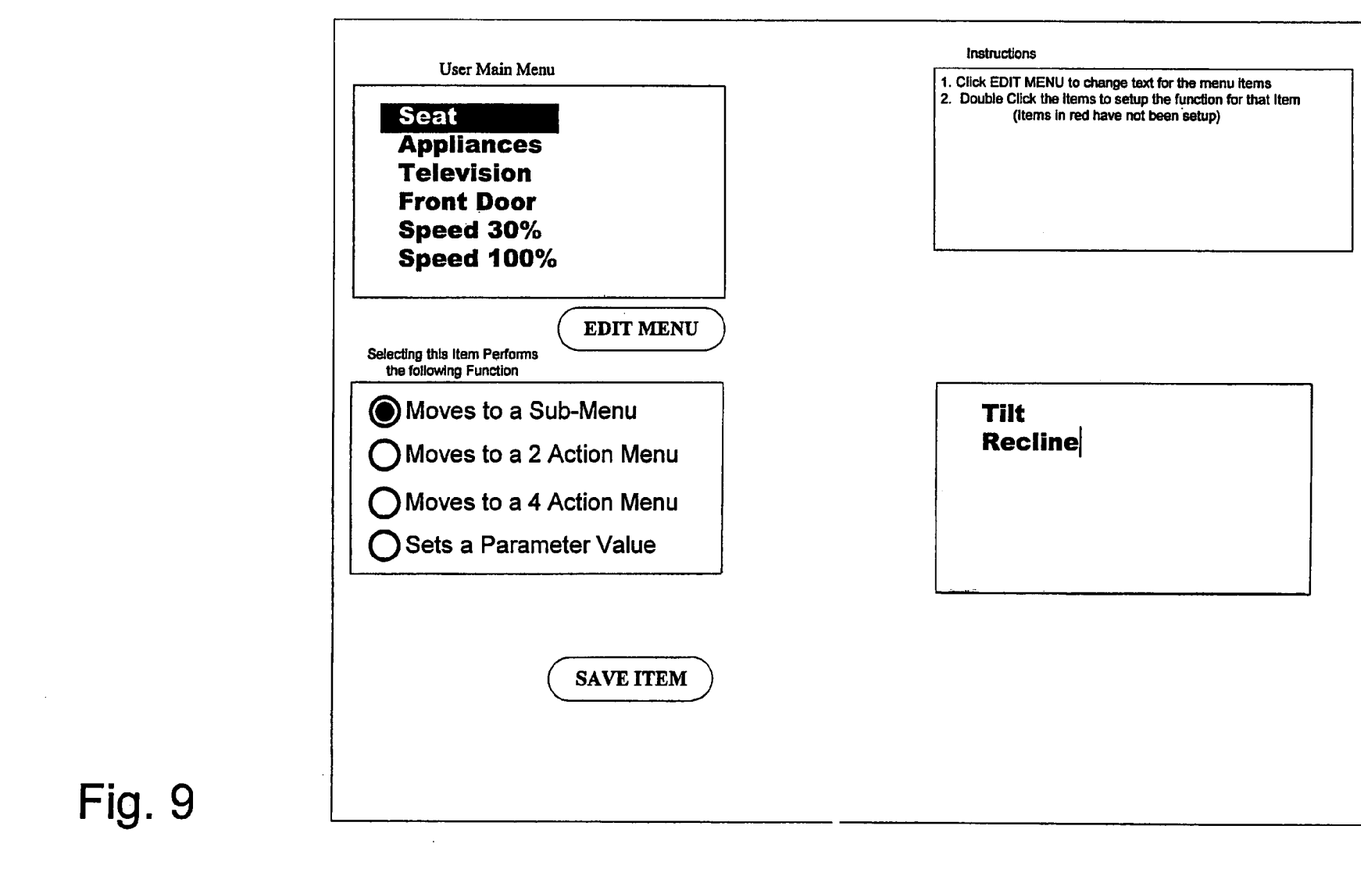
FIG. 9 is a diagrammatic representation of a menu editor window in which sub-menu selection items, action menu selection items, or parameter values may be associated with menu selection items in the main structure menu.

The main menu structure may be edited once menu selection items are entered and functions are assigned. This can be accomplished in any suitable manner. For example, a menu editor, such as the editor described above, may include an application window, as shown in FIG. 9. This window includes step-by-step instructions for editing the main menu or menu selection items therein. An item may be edited by first selecting the item and then toggling an "Edit Menu" button. This opens a list of functions that may be assigned to the item. The functions may include, for example, opening a sub-menu structure or action menu structure, or assigning a parameter value to some operation of the vehicle. A function can be selected by scrolling up or down the list to a desired function and then selecting an enter key, or by clicking on a desired function with a mouse. Alternatively, a function may be dragged and dropped from a function list into a designated field. As yet another alternative, a function may be manually entered by typing a string of characters into a field via a keypad. The characters could designate function commands, control paths, and values, wherein the microprocessor 36 of the control system 10 may enter a control mode based on the interpretation of the commands, control paths, and values. The selection of a sub-menu function requires the entry of menu selection items, such as the items labeled "Tilt" and "Recline" in the sub-menu. Functions are then assigned to these items. Once functions are assigned, the items may be saved, for example, by selecting a "Save Item" button, as shown in the drawings.

Figure 10:
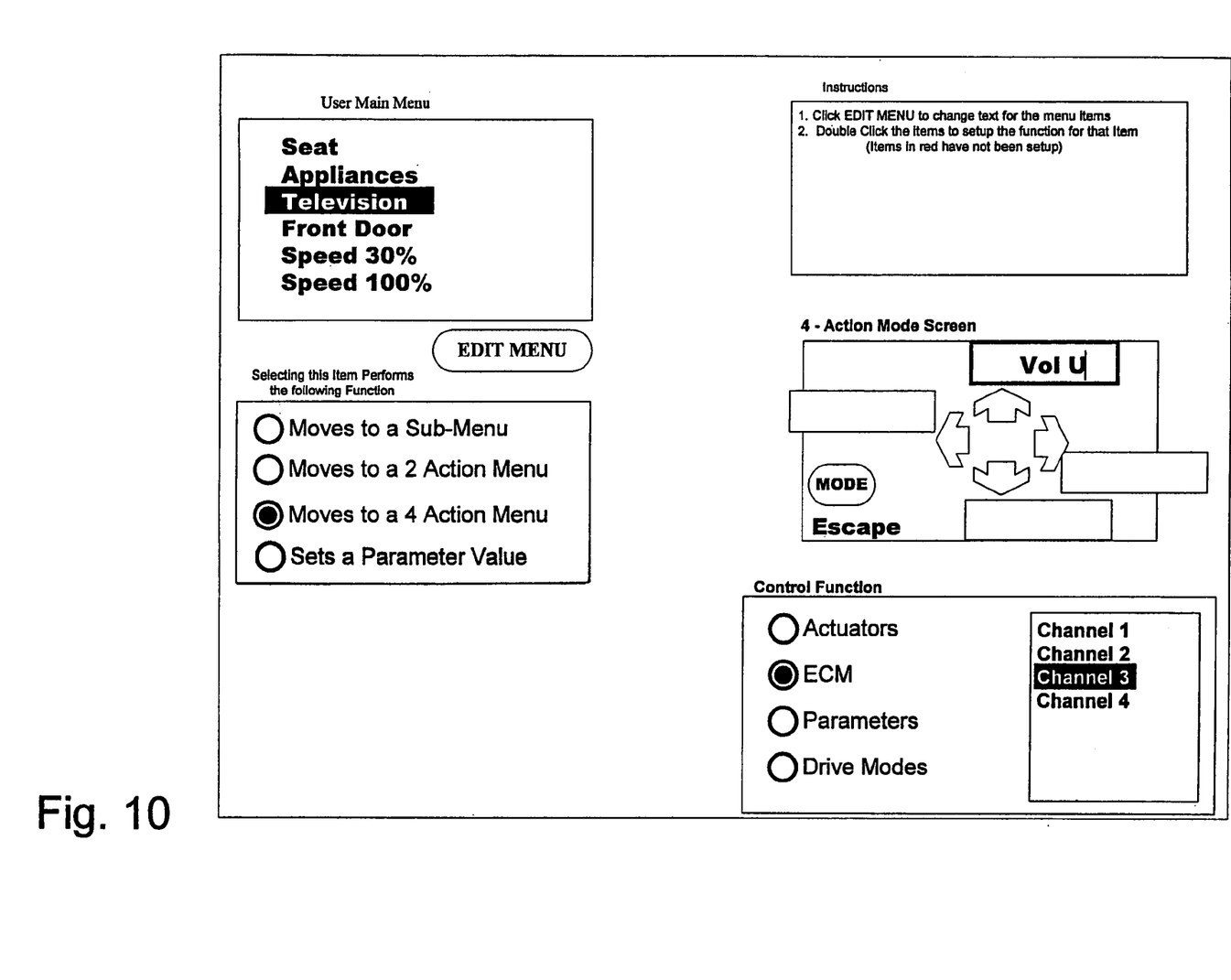
FIG. 10 is a diagrammatic representation of a menu editor window in which an action selection item is selected and assigned a function.

Another example of an application window for a menu editor is shown in FIG. 10. This window includes an "Action Mode" screen and "Function Control" screen, which pop up upon selection of an "Action Menu" selection from the function list. An action menu is created in the "Action Mode" screen. In this screen, menu labels are created for action menu selection items. Control functions are assigned to menu selection items in the "Control Function" screen. In the window illustrated, a menu selection item labeled "Television" is selected and the "Edit Menu" button is toggled. This opens a function list. A "Moves to a 4 Action Menu" function is chosen from the list. This opens an action menu having four action selection items therein. The action selection items can be labeled, for example, "Vol Up", "Vol Dn", "Ch Up", and "Ch Dn". In the illustrated window, the action selection item labeled "Vol Up" is directed to a control function labeled "ECM Channel 3", which is through channel three of the environmental control module 20. An infrared device (not shown) could be connected to a pin associated with this channel for controlling the volume of a television (not shown).

It should be understood that the invention is not intended to be limited to the application shown and described and that other applications may be suitable for carrying out the invention. For example, user-friendly menu selection items having pre-assigned functions may be selected from a list. This may include menu selection items that function to open a particular sub-menu structure with certain menu selection items therein or a particular action menu structure that has certain action selection items therein. For example, the menu selection item "Television" may have associated with it action selection items, such as "Vol Up", "Vol Dn", "Ch Up", and "Ch Dn", which are functions that are commonly associated with the operation of a television. Such action selection menu items are shown, for example, in FIG. 4.

It should also be understood that a menu editor application may be integral with the vehicle, as opposed to being removably linked to the vehicle. The operation of such a menu editor may be viewed on the vehicle display module 32 and controlled via a hand control module or a specialty input device. For example, the hand control module 12 or a specialty input device 22 shown in FIG. 1 and described above may be provided with a "PROGRAM" button that can be selected to edit the menu structure. Upon selection this button, a menu or action selection item currently used may be placed in the main menu structure. Alternatively, this button may be selected and then the hand control module 12 or a specialty input device 22 may be used to navigate through the menu to a menu selection item. Depressing this button a second time could place the selection item in the main menu.

It should further be understood that the menu structure need not be created by an application but rather may be created by someone skilled in writing and editing menu structure software or algorithms.

Figure 11:
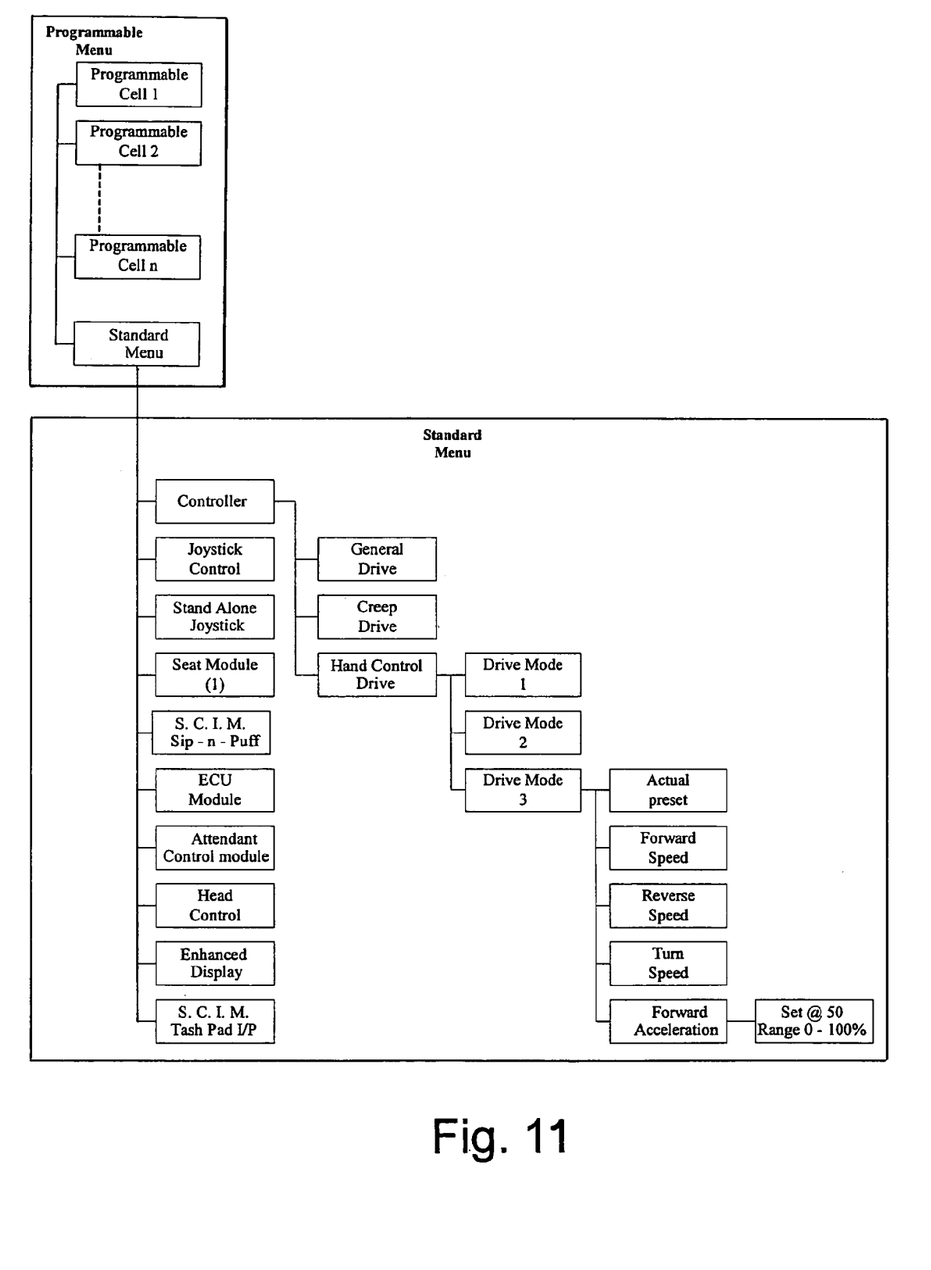
FIG. 11 is a diagrammatic representation of a menu structure that, in addition to including customized menu selection items, includes a standard menu selection item that opens a standard menu.

The menu structure of the electronic control system 10 of the present invention, in addition to a customizable menu structure, as described above, may include a standard menu selection item that opens a standard (i.e., a non-customized or default factory installed) menu structure. The standard menu structure may be provided with pointers that point to standard menu selection items that correspond to control modes of the electronic control system 10. The standard menu structure may be set up logically from general menu selection items to more specific menu selection items. As an example, a general or top-level menu structure may include menu selection items, such as "Controller", "Joystick Control", "Stand Alone joystick", "Seat Module", "S.C.I.M. Sip-n-Puff", "ECU module", and the like. By selecting one of these menu selection items, such as "Controller" the user may move to more and more specific menu selection items, such as "General Drive", "Creep Drive", or "Hand Control". Activating a particular control mode may require the selection of several menu selection items, as is clearly illustrated in FIG. 11 when setting "Forward Acceleration".

An example of another navigation through a sequence of menu selection items is shown in Table I below.

TABLE I

| Main Menu | Sub-Menu | Action Menu |
|---|---|---|
| Drive | | |
| Drive Setup | | |
| Actuators | → Actuator 1 | |
| Environ Ctrl | Actuator 2 | |
| | Actuator 3 | → Up |
| | Actuator 4 | Down |

In Table I, a main menu structure is depicted in the left column, a sub-menu structure is depicted in the center column, and an action menu structure is depicted in the right column. Each of these menus has selection items. To activate the seat recline actuator (represented by "Actuator 3") downward, the user would need to scan the menu structure six times and select three items. For example, the user would need to scan from "Drive" to "Actuators", and then from "Actuator 1" to "Actuator 3", and then from "Up" to "Down" and selection items labeled "Actuators", "Actuator 3", and "Down"). Upon selecting the "Down" action selection item in the "Actuator 3" action menu structure, the control system program would jump to a portion of the program that drives the seat recline actuator in the downward direction.

The customizable menu structure according to the present invention permits the user to select menu selection items, for example, that are accessed most often and put them into the top level or main menu structure. This main menu structure would preferably be displayed first when the user initially accesses the program embedded in the memory 38 of the electronic control system 10.

The customizable menu structure is driven by a program embedded in the memory 38 of the electronic control system 10, which may set up and initialize an array that could hold all information necessary to manage the customizable menu. For example, for each menu selection item, the array could hold three variables, including "Menu Label", "Action", and "Value". With these variables, a menu structure could be created and controlled. The "Menu Label" variable could contain the text or icon that is displayed in the menu structure. The content of the label may be associated with a particular action and may be customized to more easily identify the action for a particular user. For example, instead of "Actuator 3" in the example above, the text displayed in the menu structure could read "Recline". As stated above, the text could be customized to make it easier to relate the action menu selection item to the menu selection. This would be particularly important in "Environmental Controls", since such controls could control anything in the user's environment, such as appliances, doors, or room lights. This is especially important for children and the cognitively impaired.

The second variable in the array, "Action", could specify the action mode and control function that would be activated with the menu selection item. When the user makes a selection from the customizable menu structure, control would be passed to a command parser. The command parser could compare the value held in the "Action" variable to a list of possible actions. Upon finding a match the command parser would send control to the appropriate place in the control system program, which would complete the referenced action (i.e., enter the selected action mode and perform the associated control function).

The last variable in the array could hold a "Value", if desired. As an example, if the "Action" is "Maxspeed", the "Value" variable would hold the desired setting for the maximum speed. In this way, the user could easily set the maximum speed to 70 percent. The "Value" could also be a relative setting. For example, if the "Value" is +10, the maximum speed could be incremented by 10 percent.

The user customizable menu in accordance with the present invention may be driven by a program embedded in the memory 38 of the electronic control system 10, which accesses a lookup table, a database, or linked list. The list may contain Menu ID, Title, Function Type, and Details. An example of such a list is shown in Table II below.

TABLE II

| Menu ID | Title | Function Type | Detail |
| --- | --- | --- | --- |
| 0 | "Main User Menu" | Menu | 1, 2, 3, 4, 5, 6 |
| 1 | "Seat" | Menu | 7, 8 |
| 2 | "Appliances" | 4-Action | 9, 10, 11, 12 |
| 3 | "Television" | 5-Action | 13, 14, 15, 16, 17 |
| 4 | "Front Door" | ECU | 4, 2, 2, 500 |
| 5 | "Speed 30%" | Param | 124, 30 |
| 6 | "Edit Drive 1" | Jump | 358 |
| 7 | "Tilt" | 3-Action | 18, 17, 19 |
| 8 | "Recline" | 3-Action | 18, 17, 19 |
| 9 | "Television" | ECU | 2, 1, 4 |
| 10 | "DVD" | ECU | 2, 2, 4 |
| 11 | "VCR" | ECU | 2, 3, 4 |
| 12 | "Stereo" | ECU | 2, 4, 4 |
| 13 | "Vol Up" | ECU | 3, 1, 1 |
| 14 | "Ch Dn" | ECU | 3, 2, 1 |
| 15 | "Vol Dn" | ECU | 3, 3, 1 |
| 16 | "Ch Up" | ECU | 3, 4, 1 |
| 17 | "Drive" | Drive | |
| 18 | "Tilt Up" | Act | 3, 1 |
| 19 | "Tilt Dn" | Act | 3, 0 |

A first menu item (i.e., Menu ID 0) in Table II is entitled "Main User Menu". This is indicative by the text stored in the Title field. This text may be customizable according to user preference. This record functions as a menu and more particularly, a sub-menu. As indicated in the Detail field, Menu ID 1 through 6 would be included in the first menu item. This is clearly illustrated in FIG. 2. Each of these items has a menu function assigned to them as well.

Menu ID 1, "Seat", is assigned a menu function. It functions as a sub-menu. This sub-menu will be composed of two menu items (i.e., Menu ID 7 and 8). When the "Seat" menu item selection is selected in the main user menu, a sub-menu would open. The sub-menu would include two menu selection items, namely, "Tilt" and "Recline". When the "Tilt" menu selection item is selected, a 3-Action menu would open. The 3-Action menu would be composed of three menu items. Only three items can be assigned in this menu, as shown in FIG. 2, since "Escape" is assigned to the left arrow. The "Escape" function moves control back to the previous menu. The three assigned items of the 3-Action are Menu ID 17, 18, and 19. Menu ID 17 has the function of "Drive". This function exits the user main menu and puts the vehicle in drive mode. The other two items activate a seat actuator function. "Tilt Up" to drive the seat in the "up" (1) direction. "Tilt Dn" activates the same actuator to drive the seat in the "down" (0) direction.

Menu ID 8 also activates an actuator. This item, entitled "Recline", activates actuator 1, which reclines the seat, in a toggle mode (2). In this mode, every time the "Recline" menu selection item is selected, it drives the actuator (i.e., actuator 1) in a different direction. In this way, it toggles the actuator to be driven up and then down. The remaining menu items are assigned in a similar manner.

Figure 3:
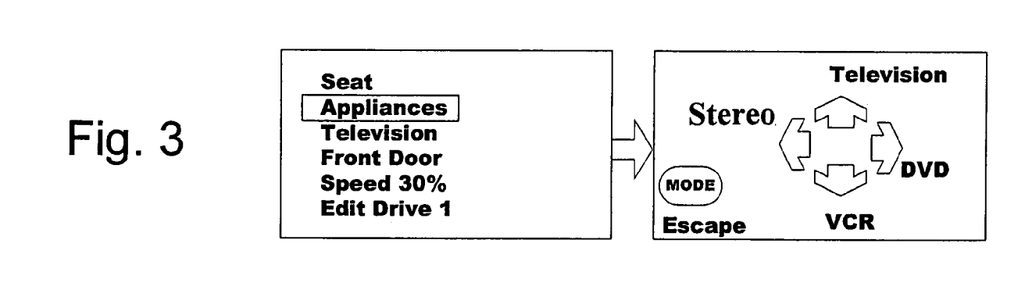
Figure 4:
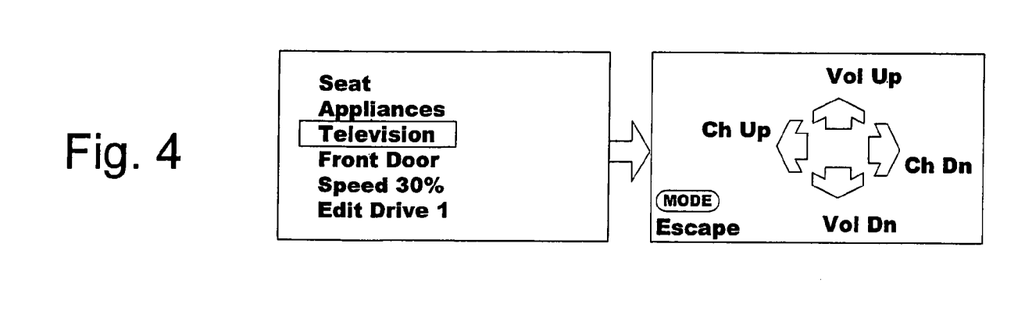
Figure 5:
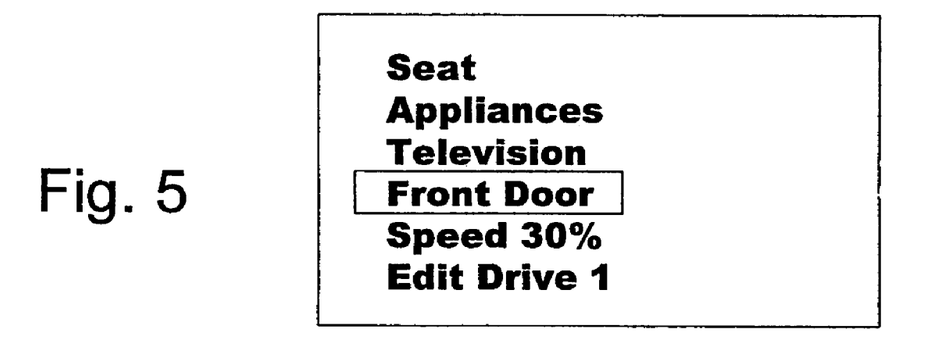

Menu ID 2 activates a 4-Action menu having four assigned items, including Menu ID 9–12. Examples of the 4-Action menus are illustrated in FIGS. 3 and 4. These four items activate Environmental Control Module (ECM) outputs. The ECM is a special output module that controls output pins arranged in channels or groups of four pins. Menu ID 9, 10, 11, and 12, each item controls a pin on channel 2. Each of these items toggles the output the ECM pin. In this example, one of the five control methods is possible. Possible control methods in this example include Momentary, Pulse, On/Off, and Toggle. In the Momentary control method, an output relay is held closed as long as the selection remains. In the Pulse control method, the relay closes for a specific period of time, preferably in milliseconds (e.g., 2,500). In the On/Off control method, the relay opens or closes (e.g., 3,1=open and 3,0=closed). In the Toggle control method, the current state of the output is toggled (i.e., if the output is "On", the output will be turned "Off"; and if the output is "Off", the output will be turned "On").

Figure 6:
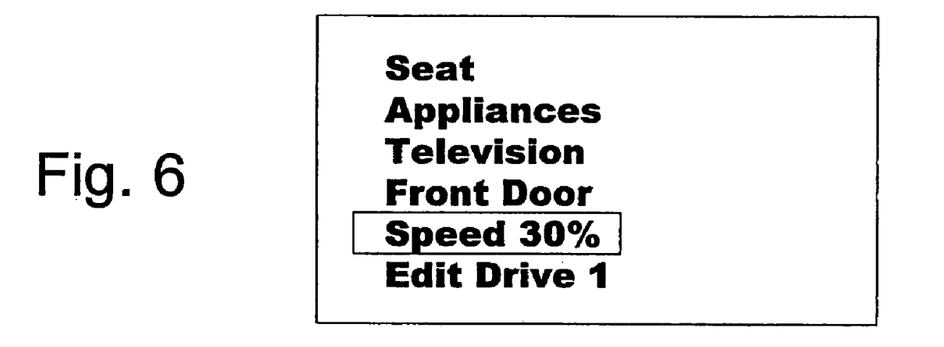
Figure 7:
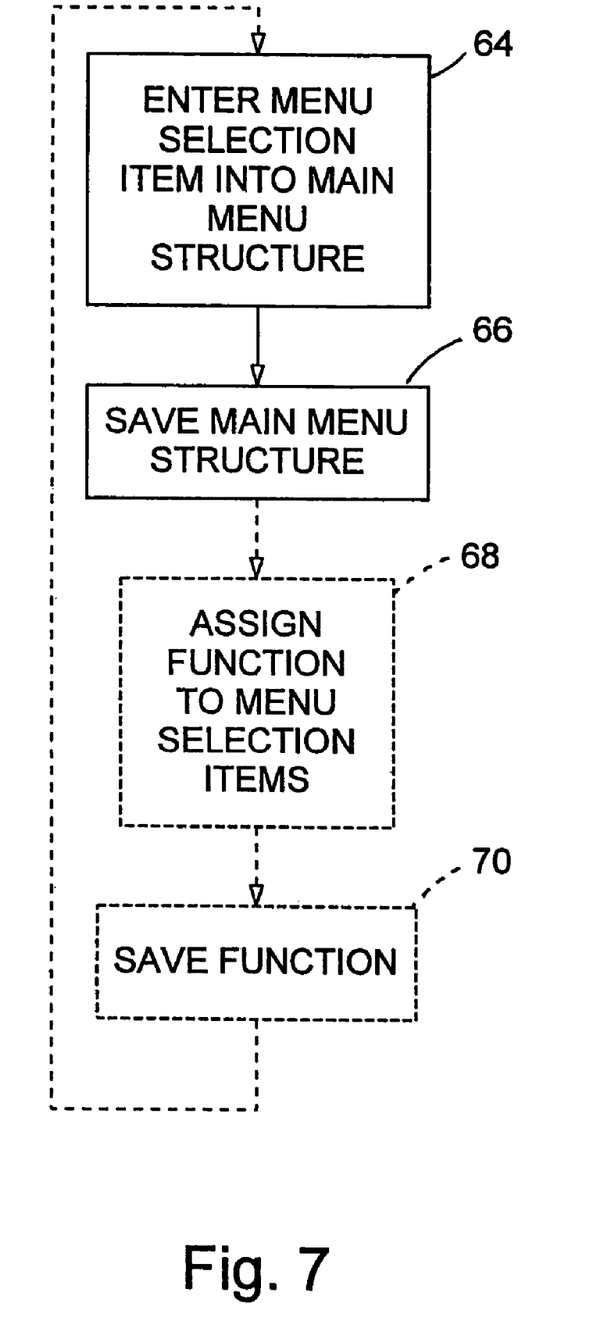
FIG. 7 is a flow diagram of a method for customizing the electronic control system menu.

Another function that is available in the main user menu is a parameter modification. An example of a menu selection item for modifying a parameter is illustrated in FIG. 6. Parameters are variable settings that the vehicle program uses to affect the way the vehicle drives and operates. Menu ID 5 is entitled "Speed 30%". When this item is activated, the parameter designated by the first number (i.e., 124) in the Detail column is set to second number (i.e., 30). In this way, the user can easily set parameters without the need to navigate through the standard menu structure. If the parameter number is prefixed by a "+" symbol, the parameter would be incremented by 30 (e.g., for the parameter +124, 30, the speed would be incremented by 30%). If the Parameter number is prefixed by a "−" symbol, the parameter would be decremented.

The last function, which is yet unexplained, is the Jump function. Item 6 is labeled "Edit Drive 1". This function moves control to a point in the list, in this case, Menu ID 358 (not shown), where Drive Profile 1 is modified in the standard menu structure. When this command is issued, the subsequent action is as though the user navigated to the standard menu structure and down to a specific menu selection item within the standard menu structure. This function saves a significant amount of navigation on the part of the user.

It should be understood that the embedded program and linked list described above is provided for illustrative purposes and the present invention is not intended to be limited the particular program or list described. In broader terms, a menu selection item is a user interface object that sends an action message to a target. For example, the menu selection item labeled "Tilt" sends an action message or control function (e.g., "up" and "down") to an actuator that causes the seat to tilt when selected. The menu selection item may send an action message to a target once if momentarily selected, but can also send an action message or control function continuously, as long as the menu selection item is continuously selected, for example, by holding a joystick in some direction continuously. In accordance with the present invention, the appearance (i.e., menu label) of the menu selection item can be customized to include text, icons, or a combination of text and icons, according to the preferences of a particular user. Similarly, the action message or control function can be programmably assigned or otherwise associated with each menu selection item, and the target to which the action message or control function is sent, can be customized for the user.

It should be appreciated that the personal mobility vehicle may include a standard menu structure having fixed menu selection items and that one or more shortcuts may point to fixed menu items, to avoid the need to frequently navigate through seldom-used portions of a standard menu structure.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A wheelchair assembly comprising:
a wheelchair;
a plurality of modules provided on the wheelchair;
an input device provided on the wheelchair;
a program controller including a display having a menu that displays a plurality of menu selection items, the program controller being responsive to the input device for selectively changing the arrangement of menu selection items on the menu of the display without changing the programming of the controller and for selectively causing the controller to operate the plurality of modules.

2. A power wheelchair comprising:
a seat;
at least one output device;
at least one drive wheel supporting the seat and output device in relation to a supporting surface; and
a control system that is programmed to control the output device, the control system comprising:
an input device; and
a display upon which a menu structure is viewed, the menu structure having an arrangement of menu selection items, at least one of which controls the output device responsive to input from the input device, the control system being configured to change the arrangement of menu selection items in the menu structure without the need for programming in code.

3. The power wheelchair of claim 2, wherein the menu selection items are arranged in a list.

4. The power wheelchair of claim 2, wherein the menu structure has a main menu and at least one sub-menu, the control system configurable to move the menu selection item that controls the output device from the sub-menu to the main menu.

5. The power wheelchair of claim 4, wherein the power seat system has a seat and a backrest and the actuator tilts or lifts the seat or reclines the backrest.

6. The power wheelchair of claim 4, wherein the power seat system has a leg rest and the actuator changes the angle of the leg rest.

7. The power wheelchair of claim 2, wherein the output device is a wheelchair accessory.

8. The power wheelchair of claim 2, wherein the output device is an environmental device.

9. The power wheelchair of claim 2, wherein the menu selection item is in the form of a text label, an icon or a combination thereof.

10. The power wheelchair of claim 2, wherein the main menu has a menu selection item that when selected opens a default menu.

11. The power wheelchair of claim 2, further comprising a connector attaching an external device to the control system, the control system configurable by the external device.

12. A power wheelchair comprising:
a power seat system comprising at least one actuator that causes the power seat system to tilt, lift or recline;
a drive wheel motor;
at least one drive wheel supporting the power seat system and the drive wheel motor in relation to a supporting surface, the drive wheel driven by the drive wheel motor; and a control system that controls the power seat actuator and the drive wheel motor, the control system comprising:
an input device; and
a display connected in relation to the input device, a menu structure viewed on the display, the menu structure having a main menu and at least one sub-menu, the main menu having a first menu selection item controlling the drive wheel motor in response to input from the input device, the sub-menu having a second menu selection item controlling the power seat system actuator in response to input from the input device, the control system configurable to move the second menu selection item from the sub-menu to the main menu.

13. The power wheelchair of claim 12, wherein the power seat system further comprises a leg rest and an actuator that changes the angle of the leg rest in response to input from the input device.

14. The power wheelchair of claim 12, further comprising a wheelchair accessory, the control system further having a third menu selection item that controls the accessory in response to input from the input device.

15. The power wheelchair of claim 12, further comprising an environmental device, the control system further having a third menu selection item that controls the environmental device in response to input from the input device.

16. The power wheelchair of claim 12, wherein the menu selection items is in the form of a text label, an icon or a combination thereof.

17. The power wheelchair of claim 12, wherein the main menu has a menu selection item that when selected opens a default menu.

18. The power wheelchair of claim 12, further comprising a connector attaching an external device to the control system, the control system configurable by the external device.

* * * * *